(12) United States Patent
Jeong et al.

(10) Patent No.: US 9,662,702 B2
(45) Date of Patent: May 30, 2017

(54) HEMMING SYSTEM OF PANELS FOR VEHICLE

(71) Applicant: Hyundai Motor Company, Seoul (KR)

(72) Inventors: In Ho Jeong, Ulsan (KR); In Kwon Lee, Ulsan (KR); Jae Ill Lee, Gyeonggi-do (KR); Kwang Hee Lee, Ulsan (KR); Sang Jin Choi, Busan (KR); Ock Do Kim, Seoul (KR); Jeong Ho Choi, Busan (KR); Se Kyu Kang, Ulsan (KR); Byeong Ho Choi, Ulsan (KR); Seon Woo Kweon, Ulsan (KR); In Hyup Im, Ulsan (KR)

(73) Assignee: Hyundai Motor Company, Seoul (KR)

( * ) Notice: Subject to any disclaimer, the term of this patent is extended or adjusted under 35 U.S.C. 154(b) by 249 days.

(21) Appl. No.: 14/171,349

(22) Filed: Feb. 3, 2014

(65) Prior Publication Data

US 2015/0082592 A1 Mar. 26, 2015

(30) Foreign Application Priority Data

Sep. 24, 2013 (KR) .......................... 10-2013-0113123

(51) Int. Cl.
*B21D 39/02* (2006.01)
*B21D 43/13* (2006.01)
(Continued)

(52) U.S. Cl.
CPC ........... *B21D 39/021* (2013.01); *B21D 43/13* (2013.01); *B21D 43/14* (2013.01); *B21D 39/023* (2013.01);
(Continued)

(58) Field of Classification Search
CPC ...... B21D 19/00; B21D 39/02; B21D 39/021; B21D 39/023; B21D 19/043; B21D 19/08; B21D 43/13; B21D 43/14; Y10T 29/53791; Y10T 29/53787; Y10T 29/53539; B23P 2700/50; B23P 21/004; B23P 21/00;
(Continued)

(56) References Cited

U.S. PATENT DOCUMENTS 6,112,390 A * 9/2000 Takeda ................. B21D 39/021
219/121.31
6,138,889 A * 10/2000 Campani ............. B23K 37/047
228/177

(Continued)

FOREIGN PATENT DOCUMENTS

JP 2000-42657 2/2000
JP 2002-187032 A 7/2002
(Continued)

*Primary Examiner* — Larry E Waggle, Jr.
*Assistant Examiner* — Mahdi H Nejad
(74) *Attorney, Agent, or Firm* — Mintz Levin Cohn Ferris Glovsky and Popeo, P.C.; Peter F. Corless

(57) ABSTRACT

A hemming system of panels for a vehicle hems panels of various types of vehicles by loading, hemming, and unloading of the panels of vehicles using twin turn tables 100 connected to each other by a carrier. As such, the hemming system improves productivity, reduces working time by automatically repeating loading, hemming, and unloading of panels and transporting of molds using platform trucks, and increases the commercial values of products by improving the quality of hemming panels.

7 Claims, 5 Drawing Sheets

(51) Int. Cl.
*B21D 43/14* (2006.01)
*B62D 65/02* (2006.01)

(52) U.S. Cl.
CPC .......... *B23P 2700/50* (2013.01); *B62D 65/02* (2013.01); *Y10T 29/53539* (2015.01); *Y10T 29/53787* (2015.01)

(58) Field of Classification Search
CPC .. B23K 37/047; B23K 2201/006; B25J 11/00; B25J 9/0084; B62D 65/02; B62D 65/026; B25B 11/02; B24B 37/345
USPC ............. 29/243.57, 281.1, 243.58, 509, 822; 72/220, 214; 414/154, 279
See application file for complete search history.

(56) References Cited

U.S. PATENT DOCUMENTS

| | | | | |
|---|---|---|---|---|
| 6,196,819 B1 * | 3/2001 | Mitamura | .......... | B29D 30/0601 425/34.1 |
| 6,227,950 B1 * | 5/2001 | Hempel | .................. | B24B 37/20 451/288 |
| 6,719,549 B1 * | 4/2004 | Mitamura | .......... | B29D 30/0601 425/34.1 |
| 8,042,249 B2 * | 10/2011 | Kilibarda | ................ | B23P 21/00 228/112.1 |
| 8,250,743 B2 * | 8/2012 | Habisreitinger | ........ | B23P 21/00 29/281.1 |
| 8,302,281 B2 * | 11/2012 | Kilibarda | ................ | B23P 21/00 29/430 |
| 8,322,005 B2 * | 12/2012 | Buse | .................... | B23P 19/047 29/235 |
| 9,003,646 B2 * | 4/2015 | Kim | ...................... | B25J 9/0084 269/289 R |
| 9,211,925 B2 * | 12/2015 | Jang | ..................... | B62D 65/026 |
| 2006/0053613 A1 | 3/2006 | Savoy | | |
| 2006/0218986 A1 * | 10/2006 | Honda | ................... | B21D 39/02 72/446 |
| 2008/0118236 A1 * | 5/2008 | Anwar | ............. | H01L 21/67201 392/411 |
| 2008/0184544 A1 * | 8/2008 | Hasegawa | ............ | B21D 19/043 29/243.57 |
| 2008/0302159 A1 * | 12/2008 | Toeniskoetter | ...... | B21D 19/043 72/214 |
| 2009/0285666 A1 * | 11/2009 | Kilibarda | ................ | B23K 37/047 414/806 |
| 2012/0146274 A1 * | 6/2012 | Kim | ..................... | B62D 65/026 269/61 |
| 2012/0260711 A1 * | 10/2012 | Ikeda | ................... | B21D 39/021 72/252.5 |
| 2013/0091699 A1 * | 4/2013 | Kim | ....................... | B25J 9/0084 29/822 |
| 2016/0013079 A1 * | 1/2016 | Choi | ................... | H01L 21/6708 156/345.21 |
| 2016/0021702 A1 * | 1/2016 | Jang | ..................... | H05B 3/0047 134/18 |

FOREIGN PATENT DOCUMENTS

| | | |
|---|---|---|
| JP | 2002-283153 A | 10/2002 |
| JP | 3529579 B2 | 5/2004 |
| KR | 10-0783834 B1 | 12/2007 |
| KR | 10-0950684 | 3/2010 |
| KR | 10-20120101729 | 9/2012 |
| KR | 10-2013-0039953 | 4/2013 |

* cited by examiner

100

111

US 9,662,702 B2

HEMMING SYSTEM OF PANELS FOR VEHICLE

CROSS-REFERENCE TO RELATED APPLICATION

This application is based on and claims priority from Korean Patent Application No. 10-2013-0113123, filed on Sep. 24, 2013 in the Korean Intellectual Property Office, the disclosure of which is incorporated herein in its entirety by reference.

BACKGROUND OF THE INVENTION

Field of the Invention

The present invention relates to a hemming system of panels for a vehicle, and more particularly, to a hemming system of panels for a vehicle which may be used for various types of vehicle and improve the quality in hemming of panels by automatically repeating loading, hemming, and unloading of panels and transporting of molds using platform trucks.

Description of the Prior Art

In general, hemming systems may form hemmed portions on inner panels and outer panels through moving assembly processes for producing front/rear doors, hoods, the trunk lid and the like of vehicles. These hemming systems form hemmed portions by loading a pair of molds on a press, inserting an inner panel and an outer panel between the molds, and vertically sliding for hemming.

As shown in FIG. 1, a hemming system of panels for a vehicle according to the related art positions an outer panel and an inner panel onto a table with a first jig 10, hems the panels utilizing a plurality of robots 30, and loads them with a second jig 20, thereby finishing a hemming process of panels for a vehicle.

The hemming system of panels for a vehicle according to the related art, however, has a problem in that the panels that may be loaded onto a table are limited. Therefore, it is difficult to hem the panels for various types of vehicles and the quality of hemming panels deteriorates because processes of loading, hemming, and unloading of panels are unstable.

SUMMARY OF THE INVENTION

Accordingly, the present invention has been made to solve the above-mentioned problems occurring in the prior art while advantages achieved by the prior art are maintained intact. One object to be achieved by the present invention is to provide a hemming system of panels for a vehicle which may be used for various types or models of vehicles and improve the quality in hemming of panels by automatically repeating loading, hemming, and unloading of panels and transporting of molds using platform trucks.

In one aspect of the present invention, there is provided a hemming system of panels for a vehicle that hems panels for a vehicle by loading, hemming, and unloading of panels for a vehicle using twin turn tables connected by rails. The twin turn tables may include a first turn table and a second turn table that are rotatable. The first turn table may have platform trucks disposed thereon.

A first carriage and a second carriage may also be disposed in parallel to the rails on outer sides of outside the twin turn tables. A loading member configured to load panels for a vehicle may be provided and may be movably disposed on the first carriage when the first turn table disposed. The first turn table and the second turn table may have a hemming member configured to hem panels for a vehicle therebetween.

The system may also include a carrier disposed on the rails and configured to carry the platform trucks from the first turn table to the hemming member. As such, the carrier, the first carriage, and the second carriage may be configured as rails.

Additionally, in some exemplary embodiments of the present invention, an unloading member configured to unload panels for a vehicle may be provided and the unloading member may be movably disposed on the second carriage where the second turn table is disposed.

BRIEF DESCRIPTION OF THE DRAWINGS

The above and other objects, features and advantages of the present invention will be more apparent from the following detailed description taken in conjunction with the accompanying drawings, in which:

FIG. 8 is a diagram showing an unloading member of the hemming system of panels for a vehicle of the present invention; and.

DETAILED DESCRIPTION OF THE PREFERRED EMBODIMENTS

Embodiments of the present invention will be described hereafter in detail with reference to the accompanying drawings.

Figure 1:
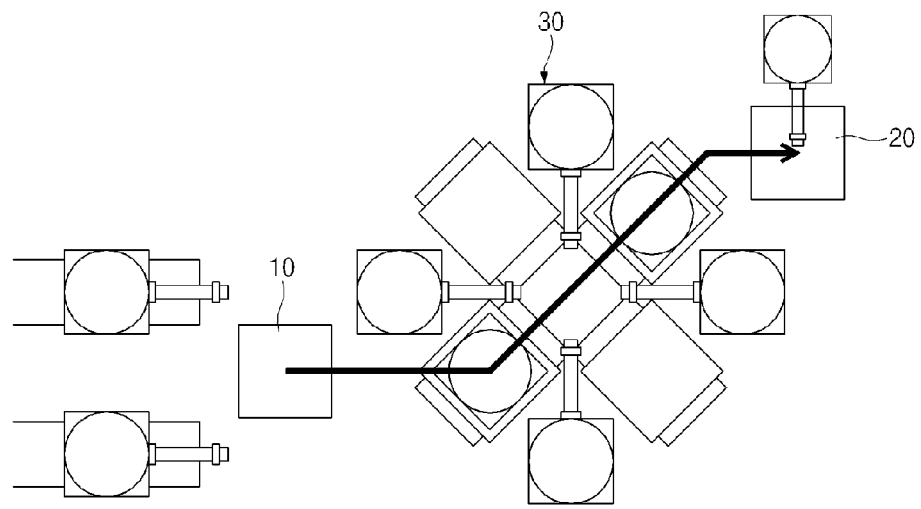
FIG. 1 is a diagram showing the structure of a hemming system of panels for a vehicle according to the related art.
Figure 2:
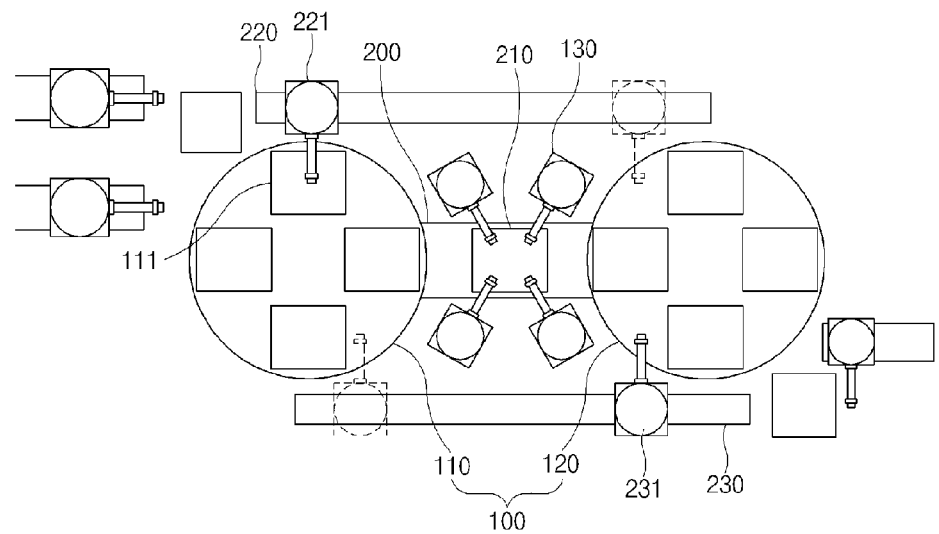
FIG. 2 is a diagram showing the structure of a hemming system of panels for a vehicle of the present invention.
Figure 3:
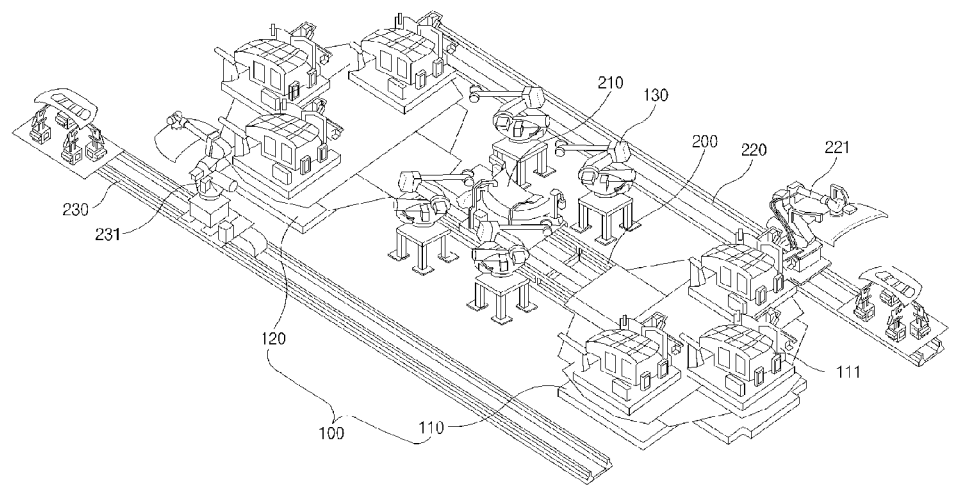
FIG. 3 is a diagram showing the hemming system of panels for a vehicle of the present invention.
Figure 4:
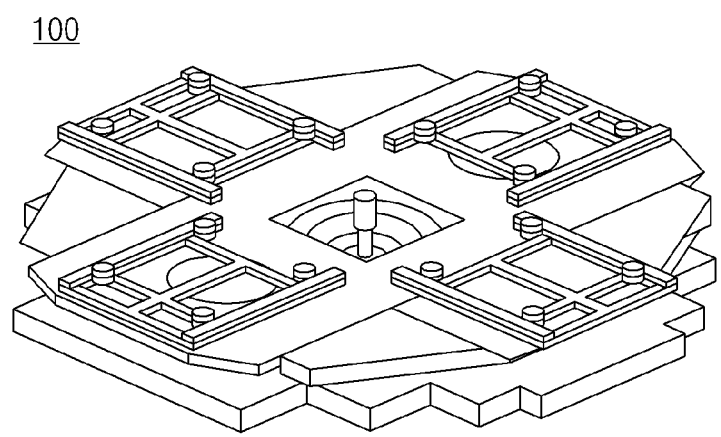
FIG. 4 is a diagram showing a turn table of the hemming system of panels for a vehicle of the present invention.

A hemming system of panels for a vehicle according to the present invention includes twin turn tables 100 connected by rails 200 and hems panels for vehicles, as shown in FIGS. 2 to 9. As shown in FIGS. 2 to 4, the twin turn tables 100 are a first turn table 110 and a second turn table 120, which are rotatable. The first turn table 110 includes platform trucks 111 that are capable of transporting panels for vehicles which are fixed thereon to the next process.

Figure 5:
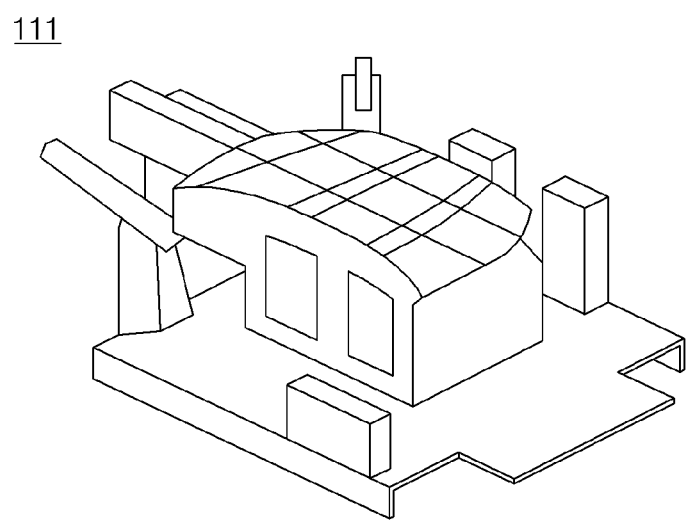
FIG. 5 is a diagram showing a platform truck of the hemming system of panels for a vehicle of the present invention.

The platform trucks 111 transport panels or hemming molds, as shown in FIG. 5, and include a fixing jig (not shown) preventing panels or hemming molds from moving. Since the first turn table 110 when the platform trucks 111 are mounted is rotatable, it is possible to move the platform trucks 111 by operating the first turn table 110.

Further, a first carriage 220 and a second carriage 230 are disposed outside the twin turn tables 100 in parallel with the rails 200 connecting the first turn table 110 and the second turn table 120 so that a loading member 221 and an unloading member 231 to be described below may move.

Figure 7:
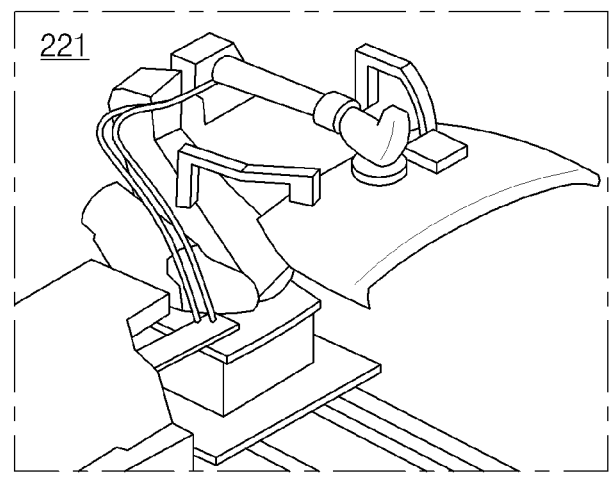
FIG. 7 is a diagram showing a loading member of the hemming system of panels for a vehicle of the present invention.
Figure 9:
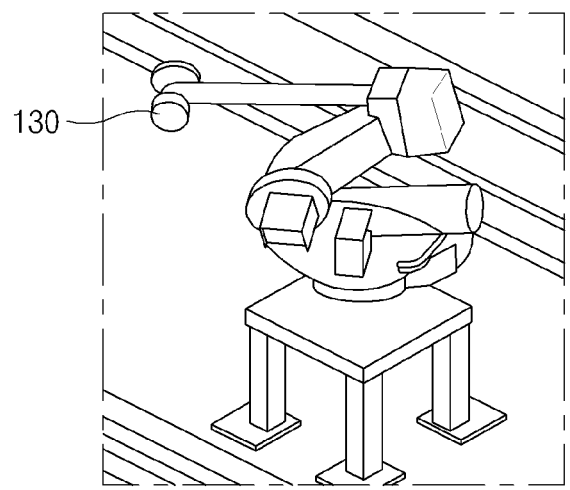
FIG. 9 is a diagram showing a hemming member of the hemming system of panels for a vehicle of the present invention.

As shown in FIGS. 2, 3 and 7, the loading member 221, which loads panels for a vehicle onto a hemming mold, is disposed to be movable on the first carriage 220 when the first turn table 110 is disposed. Hemming members 130 that hem panels for a vehicle are disposed between the first turn table 110 and the second turn table 120. In some exemplary embodiments, a plurality of hemming members 130 may be provided in order to improve precision of hemming, as shown in FIGS. 2, 3, and 9.

Figure 6:
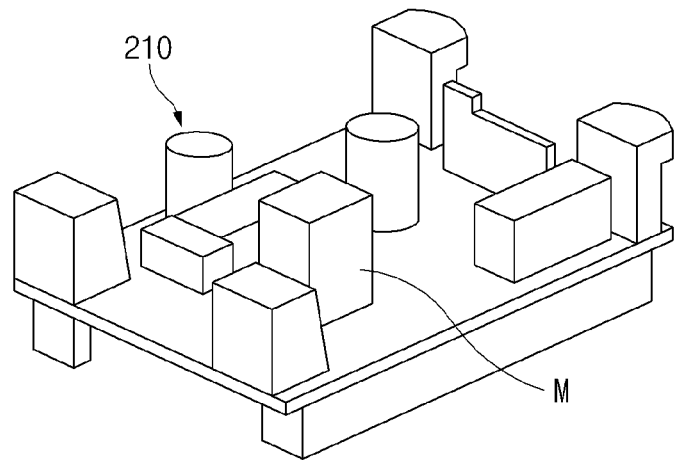
FIG. 6 is a diagram showing a carrier of the hemming system of panels for a vehicle of the present invention.

A carrier 210 is disposed on the rails 200 connecting the first turn table 110 and the second turn table 120 to allow the platform trucks 111 on the first turn table 110 to be transported to the hemming members 130. This carrier 210 may carry the platform trucks 111 via operation of a motor M, as shown in FIG. 6.

Figure 8:
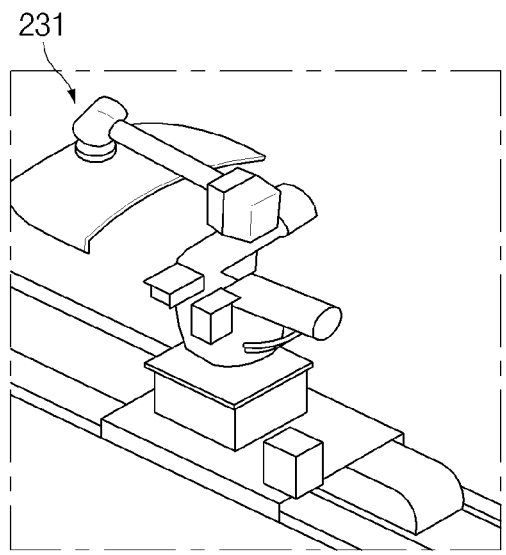

As shown in FIGS. 2, 3, and 8, an unloading member 231, which unloads panels that has hemmed, is disposed to be movable on the second carriage 230 when the second turn table 120 is disposed. The first carriage 220 and the second carriage 230 may be configured as rails so that the loading member 221 on the first carriage 220 and the unloading member 231 on the second carriage 230 may easily move when loading and unloading panels.

The loading member 221, the unloading member 231, and the hemming member 130, which are provided for automatically loading, unloading, and hemming panels, are typically implemented as robots, but structure other than robots may be used, depending on processes.

That is, according to the present invention, in the first turn table 110 and the second turn table 120 connected by the rails 200, the first turn table 110 is turned after a panel is loaded onto the first turn table 110 by the loading member 221, the panel on the first turn table 110 is carried to the hemming member 130 by the carrier 210 and the hemmed, and when hemming is finished, the hemmed panel is carried to the second turn table 120 by the carrier 210, such that it may be unloaded by the unloading member 231.

Therefore, according to the present invention, in comparison to the related art, it is possible to hem the panels of various types of vehicles, to simplify equipment and work because the carriers 210 may move between the twin turn tables 100 and loading, hemming, and unloading of panels may be automatically performed, and to increase the commercial value of products by improving productivity with a decrease in working time and improving the quality of hemming panels.

As set forth above, according to the present invention, it is possible to hem the panels of various types of vehicles, such that productivity is improved, working time is reduced by automatically repeating loading, hemming, and unloading of panels and transporting of molds using platform trucks, and the commercial values of products is increased by improving the quality of hemming panels.

Although the present invention was described with reference to limited exemplary embodiments and drawings, the present invention is not limited thereto and may be changed and modified in various ways within the spirit of the present invention and claims described below by those skilled in the art.

What is claimed is:

1. A hemming system for panels of a vehicle, comprising:
a first rotatable turn table;
a second rotatable turn table;
a first carriage and a second carriage disposed in parallel to first rails on outer sides of the first and second rotatable turn tables, the first carriage and the second carriage being second rails that extend continuously between the first and second rotatable turn tables;
a loading member configured to load panels for the vehicle; and
an unloading member configured to unload the panels for the vehicle,
wherein the first and second rotatable turn tables are connected to each other via the first rails,
the loading member is movable on the first carriage fully between the first rotatable turn table and the second rotatable turn table,
the unloading member is movable on the second carriage fully between the first rotatable turn table and the second rotatable turn table, and
a carrier is located between the first and second carriages and configured to transport the panels between the first and second rotatable turn tables.

2. The hemming system according to claim 1, wherein the first rotatable turn table has platform trucks disposed thereon.

3. The hemming system according to claim 2, wherein the carrier is disposed on the first rails and configured to carry the platform trucks from the first rotatable turn table to a hemming member.

4. The hemming system according to claim 1, wherein the loading member is movably disposed on the first carriage where the first turn table is disposed.

5. The hemming system according to claim 1, wherein the first rotatable turn table and the second rotatable turn table have a hemming member configured to hem panels for the vehicle therebetween.

6. The hemming system according to claim 1, wherein the unloading member is movably disposed on the second carriage where the second rotatable turn table is disposed.

7. The hemming system according to claim 1, wherein the first carriage and the second carriage are located outside the first and second rotatable turn tables.

* * * * *